Patented July 4, 1944

2,353,011

UNITED STATES PATENT OFFICE 2,353,011

PROCESS FOR REFINING FAT-SOLUBLE VITAMIN-CONTAINING MATERIALS

Loran O. Buxton, Belleville, N. J., assignor to National Oil Products Company, Harrison, N. J., a corporation of New Jersey No Drawing. Application January 20, 1940, Serial No. 314,799

20 Claims. (Cl. 260—420)

This invention relates to the refining of fat-soluble vitamin-containing materials, more particularly to the removal of undesirable tastes and odors from fat-soluble vitamin-containing oils and concentrates.

As is well known, fish liver oils are an excellent source of both vitamins A and D; moreover, saponification of fish liver oils and extraction of the unsaponifiable material therefrom yields fat-soluble vitamin concentrates which have found a wide variety of uses. While such products are eminently satisfactory for many purposes, they generally possess the undesirable taste and odor normally associated with products of fish origin. Fat-soluble vitamin-containing materials derived from sources other than of a fish origin also may possess undesirable tastes and odors. Many attempts have been made in an endeavor to improve the taste and odor of fat-soluble vitamin-containing materials objectionable in these respects. For example, an alkali refining method has been employed for improving the tastes and odors of vitamin oils; in this method an alkali soap is prepared in the presence of the oil and then removed, the soap tending to carry with it some of the objectionable taste and odor. However, this method possesses many disadvantages among them being that the oil becomes less stable when treated in this manner; furthermore, the odor and taste of the oil are not improved as much as might be desired. Another method commonly employed for improving the taste and odor of vitamin oils and concentrates involves passing steam through the heated oil or concentrate at a reduced pressure; while this method effects some deodorization, the deodorization is in most cases merely temporary, and, furthermore, this process removes only objectionable constituents of a volatile nature.

It has been proposed to stabilize oils having a tendency to become rancid, e. g., cottonseed oil, by contacting the oils with meals at temperatures ranging between room temperature and about 65° C. Attempts have been made to apply this method to the refining of fat-soluble vitamin-containing materials having objectionable tastes and odors, but it was found to be rather unsuccessful because the odors and tastes of the vitamin-containing materials were not materially improved.

It is an object of this invention to provide substantially odorless and tasteless fat-soluble vitamin-containing materials.

It is another object of this invention to provide a process for improving the taste and odor of fat-soluble vitamin-containing materials having objectionable tastes and odors.

I have found that the undesirable tastes and odors of fat-soluble vitamin-containing materials objectionable in these respects may be substantially completely removed by contacting such fat-soluble vitamin-containing materials with vapors evolved by heating a vegetable meal at temperatures between about 100° C. and about 200° C., preferably between about 160° C. and about 180° C. The fat-soluble vitamin-containing material may be treated in accordance with my invention by mixing the material with the vegetable meal and heating the mixture at temperatures between about 100° C. and about 200° C. in an open vessel; preferably, however, the material is mixed with the meal and the mixture heated to the desired temperature in the presence of an inert gas and under reduced pressure in order to minimize destruction of the vitamins and to assist the removal of odoriferous substances. My invention may also be carried out by heating a vegetable meal to a temperature between about 100° C. and about 200° C. and passing the evolved vapors through the vitamin-containing material. The refining process of my invention may be combined with other refining processes for improving the character of fat-soluble vitamin-containing materials; thus, for example, these materials may be treated with a vegetable meal in accordance with any of the above embodiments of my invention and the mass then contacted with decolorizing carbon in order to obtain a light-colored product. When the refining treatments carried out in accordance with my invention are substantially complete, the fat-soluble vitamin-containing material may be separated from the meal in any suitable manner and processed as desired; however, if it is desired to prepare meals containing fat-soluble vitamins, the vitamins may remain incorporated with the meal. It will be found that in every case the resulting products possess substantially no undesirable tastes or odors and hence are eminently suitable for practically all purposes, particularly for human consumption; moreover, the vitamin potencies of the materials refined are not materially affected. Furthermore, I have found that the process of my invention greatly improves the stability of the fat-soluble vitamin-containing materials, as is evidenced by the fact that the peroxide numbers of these materials are substantially lowered thereby.

Any fat-soluble vitamin-containing material having an undesirable taste and odor may be treated in accordance with my invention; thus materials containing vitamins A, D, E or K, such as, for example, cod liver oil, halibut liver oil, sword fish liver oil, tuna liver oil, shark liver oil, whale liver oil, porpoise liver oil, seal liver oil and similar oils may be treated, as well as fat-soluble vitamin concentrates obtained, for example, by saponification of a vitamin-containing oil and extraction of the unsaponifiable material. The process of my invention is particularly applicable to the refining of vitamin A or D-containing oils or vitamin D concentrates of fish origin, since treatment of such materials in accordance with my invention produces products far superior to any of those now on the market. The vitamin-containing materials to be treated in accordance with my invention should not contain any foreign metals, since the presence of such metals usually accelerates deterioration of the vitamin A or D content of the oil or concentrate at the elevated temperatures employed.

The meal employed in accordance with my invention may be any vegetable meal such as, for example, cottonseed meal, soybean meal, sesame meal, oatmeal, corn meal, corn germ meal, wheat germ meal, alfalfa leaf meal, rye, barley and other vegetable meals well known to the art. These meals may be prepared by either cold pressing or expelling oil from the vegetable and grinding, or by extracting the oil from the vegetable with a solvent and grinding. Preferably a meal having a low oil content prepared by cold pressing or expelling oil from the vegetable is employed. I prefer to use cottonseed meal in the practice of my invention since this meal is readily available, very inexpensive and gives excellent results. It is advantageous to substantially completely deaerate the meal before it is employed in the practice of my invention in order to minimize oxidation of the vitamins during the refining process. The meal is preferably finely ground before use; thus, for example, cottonseed meal sifted through a 60 mesh screen is suitable.

In carrying out the process of my invention a fat-soluble vitamin-containing material having an objectionable taste and odor may be mixed with a suitable amount of a vegetable meal and the mixture then heated to a temperature between about 100° C. and about 200° C., whereby vapors are evolved from the meal. The amount of meal admixed with the vitamin-containing material may vary widely depending to some extent upon the particular meal employed and to some extent upon the odor and taste of the vitamin-containing material to be refined; generally, however, an amount of meal between about 0.5% and about 10% of the weight of the vitamin-containing material is suitable. Antioxidants such as hydroquinone may be added to the mixture, if desired. The temperature at which the mixture is heated is particularly important, since I have found that at temperatures below about 100° C. the undesirable taste and odor are not substantially completely removed from the fat-soluble vitamin-containing material. I prefer to heat the mixture to a temperature between about 160° C. and about 180° C. since at these temperatures optimum results are obtained. The temperature should preferably not exceed about 200° C., particularly if a vitamin A-containing material is being treated, since deterioration of the vitamin is apt to commence at such temperatures.

The heating may be conducted in an open vessel if desired; however, in order to avoid the danger of deterioration of the vitamin A content of the materials treated in accordance with my invention, the heating step is preferably carried out in the presence of an inert gas such as nitrogen or carbon dioxide. Furthermore, I have found it desirable to heat the mixture at reduced pressures, preferably at pressures below about 20 mm., since under these conditions removal of the odoriferous constituents of the oil or concentrate is accelerated. The time of heating may vary to some extent; generally between about two minutes and about 1 hour, e. g., between about 5 minutes and about 15 minutes, are sufficient.

In some cases it may be found that the process of my invention, while it substantially improves the odor and taste of the fat-soluble vitamin-containing materials, also imparts thereto a color somewhat darker than that possessed by the original material. This color may be easily removed by contacting the refined vitamin-containing material with a decolorizing agent such as decolorizing carbon, whereupon a light-colored product substantially free from taste and odor may be obtained.

After the fat-soluble vitamin-containing material has been heated with the meal in accordance with my invention, the material may be cooled and separated from the meal in any suitable manner. Thus, for example, if a fish liver oil is treated in accordance with my invention, the oil may be filtered or centrifuged from the meal in any suitable manner. When recovering a fat-soluble vitamin concentrate treated in accordance with my invention, it has been found advisable in many cases to add a suitable amount of a solvent for the concentrate to the mixture of concentrate and meal and then to remove the meal from the vitamin solution. This method of operation has the advantage that very little, if any, of the vitamin-containing material is left on the meal. The vitamin-containing material may be recovered from the solution thereof in any of the many ways known to the art.

Fat-soluble vitamin containing materials may also be refined in accordance with my invention by heating a vegetable meal to temperatures between about 100° C. and about 200° C. preferably between about 160° C. and about 180° C., and passing the vapors evolved from the meal through the vitamin-containing material for a suitable time, the vitamin material preferably being heated, e. g., to a temperature of about 125° C.; it is preferred to maintain the heated vitamin-containing material in an inert gas atmosphere and under reduced pressure during this refining process. This method of operation has the advantage that the fat-soluble vitamin-containing material need not be heated to as high a temperature as when the method described above is employed. However, it usually is not as convenient to carry out.

My invention is also applicable to the production of meals fortified with fat-soluble vitamins having substantially no objectionable taste and odor. Such products may be prepared by mixing a vegetable meal with a fat-soluble vitamin-containing material having an objectionable taste and odor, the amount of vitamin material varying between about 2 and about 20% of the weight of the meal, and then heating the mixture to a temperature between about 100° C. and about 200° C., preferably between about 100° C. and about 130° C. The products thus obtained contain the vitamins in a form such that they possess no objectionable taste and odor; hence such fortified meals are suitable for a wide variety of purposes.

The refined products of my invention possess very little, if any, of the objectionable taste and odor characteristic of the materials from which they are obtained; hence these products are eminently suitable for a variety of purposes and find particular application in the preparation of vitamin products for human consumption. Furthermore, extensive tests have indicated that the products of my invention have substantially lower peroxide numbers than those of the original vitamin-containing materials; this factor is of great importance since vitamin-containing materials having low peroxide numbers are much more stable than those having high peroxide numbers. Thus it will be evident that my invention not only improves the taste and odor of the fat-soluble vitamin-containing materials, but also improves their stability.

From my observations I believe that the vapors liberated by heating a vegetable meal to the elevated temperatures employed in accordance with my invention are largely responsible for the refining action of these meals on fat-soluble vitamin-containing materials, and that these liberated vapors result from the partial decomposition of the vegetable meal or from the partial or complete decomposition of certain constituents naturally present therein. However, the presence of the solid meal in the vitamin-containing material probably has some additional effect on the refining action displayed by the meals. Hence I do not wish to be confined to any particular theory as to the manner in which my invention operates.

The following examples are illustrative of my invention; amounts are given in parts by weight.

*Example I*

25 parts of crude shark liver oil containing 113,000 A units per gram and having a very fishy taste and odor were mixed with 2.5 parts of cottonseed meal sifted through a 60 mesh screen. The mixture was then heated at 170° C. for 10 minutes in a nitrogen atmosphere and under 15 mm. pressure. At the end of this time, the oil was permitted to cool and was then filtered from the meal. The resulting product was substantially odorless and tasteless and had practically the same vitamin A potency as the original oil. The peroxide number of the refined oil was 0, whereas the original oil had a peroxide number of 11.5.

*Example II*

50 parts of crude shark liver oil containing 116,000 A units per gram and having a very fishy taste and odor were mixed with 5 parts of corn gluten meal sifted through a 60 mesh screen. The mixture was then heated at 160° C. for 15 minutes in a carbon dioxide atmosphere and under 15 mm. pressure. At the end of this time, the oil was permitted to cool and was then filtered from the meal. The resulting product was substantially odorless and tasteless and had practically the same vitamin A potency as the original oil. The peroxide number of the refined oil was 0, whereas the original oil had a peroxide number of 3.75.

*Example III*

50 parts of a crude shark liver oil containing 24,000 A units per gram and having a very fishy taste and odor were mixed with 5 parts of cottonseed meal sifted through a 60 mesh screen. The mixture was then heated at 170° C. for 5 minutes in a nitrogen atmosphere and under 10 mm. pressure. At the end of this time, the oil was permitted to cool and was then filtered. The resulting product was substantially odorless and tasteless and had practically the same vitamin A content as the original oil.

*Example IV*

100 parts of halibut liver oil containing 58,000 A units per gram and having a very fishy odor and taste were mixed with 5 parts of soya bean meal sifted through a 60 mesh screen. This mixture was then heated at a temperature of 180° C. for 5 minutes in a nitrogen atmosphere and under 10 mm. pressure. At the end of this time, the oil was permitted to cool and was then filtered. The resulting product was practically odorless and tasteless and had substantially the same vitamin A content as the original oil.

*Example V*

100 parts of halibut liver oil containing 58,000 A units per gram and having a very fishy taste and odor were mixed with 5 parts of corn meal sifted through a 60 mesh screen. The mixture was then heated at 180° C. for 5 minutes in a nitrogen atmosphere and under 10 mm. pressure. At the end of this time, the oil was permitted to cool and was then filtered. The resulting product was odorless and tasteless and possessed substantially the same vitamin A content as the original oil.

*Example VI*

100 parts of a vitamin concentrate containing 567,000 A units per gram and having a very bitter taste and an objectionable odor were mixed with 5 parts of cottonseed meal sifted through a 60 mesh screen. The mixture was then heated at a temperature of 170° C. for 5 minutes in a nitrogen atmosphere and under 10 mm. pressure. At the end of this time, the mass was permitted to cool and was then filtered. The resulting product had a very slight bitter taste and practically no odor, and possessed substantially the same vitamin A content as the original concentrate.

*Example VII*

100 parts of a vitamin concentrate containing 567,000 A units per gram and having a very bitter taste and an objectionable odor were mixed with 5 parts of cottonseed meal sifted through a 60 mesh screen. The mixture was then heated at 170° C. for 5 minutes in a nitrogen atmosphere and under 10 mm. pressure. The mass was permitted to cool, the cooled mass was taken up in methyl alcohol and the meal removed by filtration. The alcoholic solution thus formed was agitated with 10 parts of decolorizing carbon for 30 minutes. The carbon was then filtered from the solution and the methyl alcohol removed by evaporation under a vacuum in a nitrogen atmosphere. The resulting product was a light-colored concentrate having a very slight bitter taste and substantially no objectionable odor; it possessed practically the same vitamin A content as the original concentrate.

*Example VIII*

100 parts of cod liver oil containing 1760 A units per gram and having a very fishy taste and odor were mixed with 5 parts of cottonseed meal sifted through a 60 mesh screen. The mixture was then heated at 170° C. for 5 minutes in a nitrogen atmosphere and under 10 mm. pressure. At the end of this time, the oil was permitted to cool and was then filtered. The resulting oil was substantially odorless and tasteless and had practically the same vitamin A content as the original oil.

Example IX 100 parts of a concentrate containing 815,000 A units per gram and 1,000,000 D units per gram and having a very bitter taste and an objectionable odor were mixed with 5 parts of cottonseed meal sifted through a 60 mesh screen. The mixture was then heated at 170° C. for 5 minutes in a nitrogen atmosphere and under 10 mm. pressure. At the end of this time, the mass was permitted to cool and was then filtered. The resulting product was a concentrate having substantially the same A and D contents as the original concentrate and possessing only a very slight bitter taste and no objectionable odor.

Example X 25 parts of halibut liver oil containing 58,000 A units per gram and having a very fishy taste and odor were heated to about 125° C. in a nitrogen atmosphere and under 10 mm. pressure. 15 parts of cottonseed meal were heated in a separate container to 170° C. and the vapors evolved were passed through the halibut liver oil for 30 minutes. At the end of this time, the oil was permitted to cool. The resulting product was odorless and tasteless and had substantially the same vitamin A content as the original oil.

It will be evident from the above description that my invention provides a new and effective method of preparing substantially odorless and tasteless fat-soluble vitamin-containing materials from fat-soluble vitamin-containing materials having objectionable tastes and odors. My invention will, therefore, be of great interest to those engaged in the preparation of vitamin compositions, particularly for human and animal consumption.

It is to be understood that the vitamin contents of the various oils and concentrates mentioned in the specification are given in International vitamin units. Furthermore, the term "vegetable meal" is used throughout the specification and claims in a broad sense and is intended to include meals obtained from any material of vegetable origin, thus including meals obtained from seeds, leaves and other materials of vegetable origin.

Since certain changes in carrying out the above process and certain modifications in the compositions which embody the invention may be made without departing from its scope, it is intended that all matter contained in the above description shall be interpreted as illustrative and not in a limiting sense.

Having described my invention, what I claim as new and desire to secure by Letters Patent is:

1. A process for the preparation of substantially odorless and tasteless fat-soluble vitamin-containing materials from fat-soluble vitamin-containing materials having objectionable tastes and odors, which comprises contacting a fat-soluble vitamin-containing material having an objectionable taste and odor with vapors evolved from a vegetable meal at a temperature between about 100° and about 200° C. at a pressure of not more than 20 mm.

2. A process for the preparation of substantially odorless and tasteless fat-soluble vitamin-containing materials from fat-soluble vitamin-containing materials having objectionable tastes and odors, which comprises contacting a fat-soluble vitamin-containing material having an objectionable taste and odor with vapors evolved from a vegetable meal at a temperature between about 160° and about 180° C. at a reduced pressure.

3. A process for the preparation of substantially odorless and tasteless fat-soluble vitamin-containing materials from fat-soluble vitamin-containing materials having objectionable tastes and odors, which comprises contacting a fat-soluble vitamin-containing material having an objectionable taste and odor with vapors evolved from a vegetable meal at a temperature between about 100° and about 200° C. in an inert gas atmosphere and at a reduced pressure.

4. A process for the preparation of substantially odorless and tasteless fat-soluble vitamin-containing materials from fat-soluble vitamin-containing materials having objectionable tastes and odors, which comprises contacting a fat-soluble vitamin-containing material having an objectionable taste and odor with vapors evolved from a vegetable meal at a temperature between about 160° and about 180° C. at a reduced pressure.

5. A process for the preparation of substantially odorless and tasteless fat-soluble vitamin-containing materials from fat-soluble vitamin-containing materials having objectionable tastes and odors, which comprises contacting a fat-soluble vitamin-containing material having an objectionable taste and odor with vapors evolved from a vegetable meal at a temperature between about 160° and about 180° C. in an inert gas atmosphere and at a reduced pressure.

6. A process for the preparation of substantially odorless and tasteless fat-soluble vitamin-containing materials from fat-soluble vitamin-containing materials having objectionable tastes and odors, which comprises mixing a fat-soluble vitamin-containing material having an objectionable taste and odor with a vegetable meal and heating the mixture at a temperature between about 160° and about 180° C. at a reduced pressure.

7. A process for the preparation of substantially odorless and tasteless fat-soluble vitamin-containing materials from fat-soluble vitamin-containing materials having objectionable tastes and odors, which comprises mixing a fat-soluble vitamin-containing material having an objectionable taste and odor with a vegetable meal and heating the mixture at a temperature between about 160° and about 180° C. in an inert gas atmosphere and at a reduced pressure.

8. A process for the preparation of substantially odorless and tasteless fat-soluble vitamin-containing materials from fat-soluble vitamin-containing materials having objectionable tastes and odors, which comprises heating a vegetable meal to a temperature between about 100° and about 200° C. and passing the vapors evolved from the meal through a fat-soluble vitamin-containing material having an objectionable taste and odor, said material being maintained under subatmospheric pressure.

9. A process for the preparation of substantially odorless and tasteless fat-soluble vitamin-containing materials from fat-soluble vitamin-containing materials having objectionable tastes and odors, which comprises heating a vegetable meal to a temperature between about 100° and about 200° C. and passing the vapors evolved from the meal through a fat-soluble vitamin-containing material having an objectionable taste and odor, said material being maintained at an elevated temperature, at a reduced pressure and in an inert gas atmosphere.

10. A process for the preparation of substantially odorless and tasteless fat-soluble vitamin-containing materials from fat-soluble vitamin-containing materials having objectionable tastes and odors, which comprises contacting a fat-soluble vitamin-containing material having an objectionable taste and odor with vapors evolved from cottonseed meal at a temperature between about 160° C. and about 180° C. in an inert gas atmosphere and at a reduced pressure.

11. A process for the preparation of substantially odorless and tasteless fat-soluble vitamin-containing materials from fat-soluble vitamin-containing materials having objectionable tastes and odors, which comprises contacting a fat-soluble vitamin-containing material having an objectionable taste and odor with vapors evolved from soyabean meal at a temperature between about 160° C. and about 180° C. in an inert gas atmosphere and at a reduced pressure.

12. A process for the preparation of substantially odorless and tasteless fat-soluble vitamin-containing materials from fat-soluble vitamin-containing materials having objectionable tastes and odors, which comprises contacting a fat-soluble vitamin-containing material having an objectionable taste and odor with vapors evolved from corn meal at a temperature between about 160° C. and about 180° C. in an inert gas atmosphere and at a reduced pressure.

13. A process of refining a natural vitamin-containing oil to render the same substantially odorless and tasteless, which comprises subjecting a fish liver oil to the action of vapors liberated from a vegetable meal heated within the range of about 100° C. to 200° C. at a reduced pressure.

14. A process of refining a natural vitamin-containing oil to render the same substantially odorless and tasteless, which comprises admixing a fish liver oil with a vegetable meal and heating the mixture within the range of about 100° C. to 200° C. at a pressure of not more than 20 mm.

15. A process of refining a natural vitamin-containing oil to render the same substantially odorless and tasteless, which comprises admixing a fish liver oil with a vegetable meal and heating the mixture under sub-atmospheric pressure within the range of about 160° C. to 180° C. in the presence of an inert gas.

16. A process of refining a natural vitamin-containing oil to render the same substantially odorless and tasteless, which comprises admixing a cod liver oil with a vegetable meal and heating the mixture under sub-atmospheric pressure within the range of about 160° to 180° C. in the presence of an inert gas.

17. A process of refining a natural vitamin-containing oil to render the same substantially odorless and tasteless, which comprises admixing a halibut liver oil with a vegetable meal and heating the mixture under sub-atmospheric pressure within the range of about 160° C. to 180° C. in the presence of an inert gas.

18. A process of refining a natural vitamin-containing oil to render the same substantially odorless and tasteless, which comprises admixing a shark liver oil with a vegetable meal and heating the mixture under sub-atmospheric pressure within the range of about 160° C. to 180° C. in the presence of an inert gas.

19. A process of refining a natural vitamin-containing material to render the same substantially odorless and tasteless, which comprises admixing a fish liver oil concentrate with a vegetable meal and heating the mixture within the range of about 100° C. to 200° C. at a pressure of not more than 20 mm.

20. A process of refining a natural vitamin-containing material to render the same substantially odorless and tasteless, which comprises admixing a fish liver oil concentrate with a vegetable meal and heating the mixture under sub-atmospheric pressure within the range of about 160° C. to 180° C. in the presence of an inert gas.

LORAN O. BUXTON.

CERTIFICATE OF CORRECTION.

Patent No. 2,353,011. July 4, 1944.

LORAN O. BUXTON.

It is hereby certified that error appears in the printed specification of the above numbered patent requiring correction as follows: Page 4, first column, line 72, claim 1, for the words "at a pressure of not more than 20 mm." read --at a reduced pressure.--; and second column, line 7, claim 2, for "at a reduced pressure." read --at a pressure of not more than 20 mm.--; and that the said Letters Patent should be read with this correction therein that the same may conform to the record of the case in the Patent Office.

Signed and sealed this 12th day of September, A. D. 1944.

Leslie Frazer (Seal)                    Acting Commissioner of Patents.